(No Model.)

V. C. JARBOE.
HOISTING MACHINE.

No. 253,714.  Patented Feb. 14, 1882.

WITNESSES:

INVENTOR:
V. C. Jarboe
BY Munn & Co
ATTORNEYS.

UNITED STATES PATENT OFFICE.

VERNON C. JARBOE, OF WYANDOTTE, KANSAS.

HOISTING-MACHINE.

SPECIFICATION forming part of Letters Patent No. 253,714, dated February 14, 1882.

Application filed June 16, 1881. (No model.)

*To all whom it may concern:*

Be it known that I, VERNON C. JARBOE, of Wyandotte, in the county of Wyandotte and State of Kansas, have invented a new and Improved Hoisting-Machine, of which the following is a full, clear, and exact specification.

The object of my invention is to provide a hoisting-machine having such construction that the power may be disconnected from direct action upon the winding-drum and simultaneously applied thereto indirectly for the purpose of increasing the lifting capacity of the apparatus.

The invention consists in the combination and arrangement of parts, as will be more fully set forth hereinafter, and pointed out in the claims.

Figure 1:
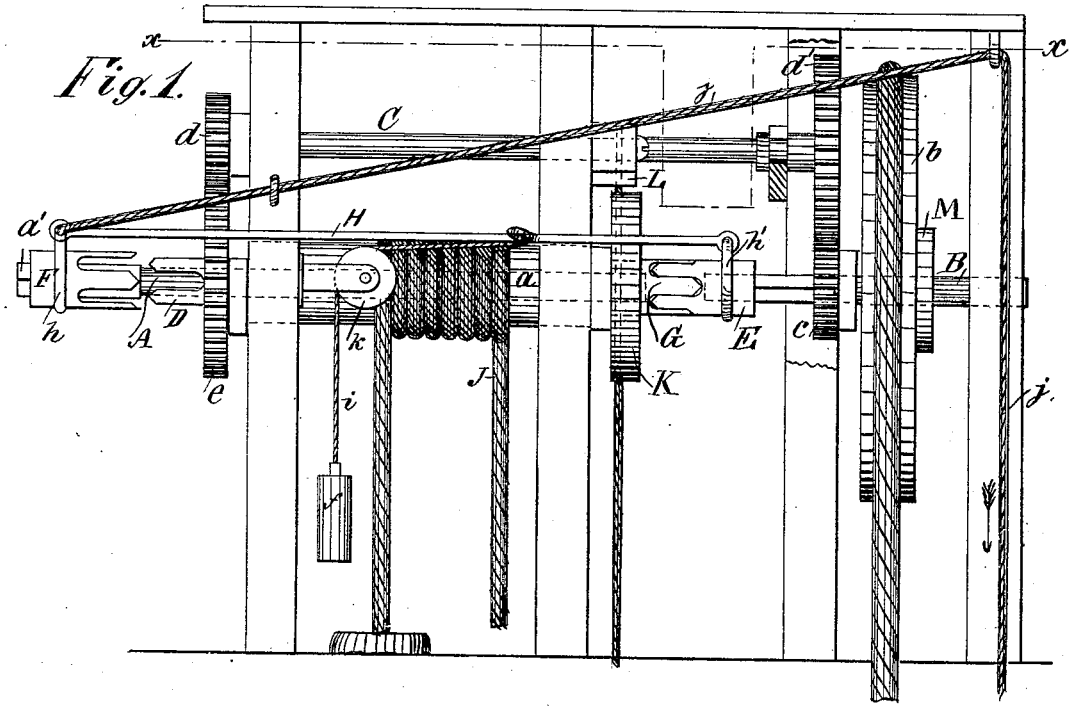
Figure 2:
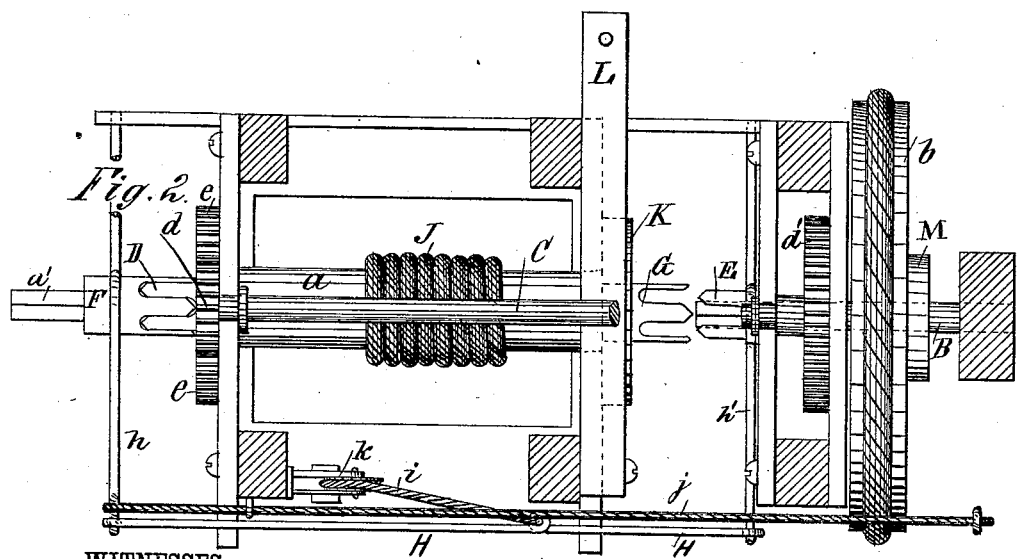

In the accompanying drawings, Figure 1 is a front elevation of my invention. Fig. 2 is a horizontal section taken on the line $xx$ of Fig. 1.

Similar letters of reference indicate corresponding parts.

The shaft A, upon which the winding-drum $a$ is secured, and the shaft B, upon which the power-pulley $b$ is secured, are journaled in the frame or housing of the machine in line with each other.

Journaled in the frame above the shafts A and B, and parallel therewith, is the shaft C, upon the ends of which are fixed the gear-wheels $d$ $d'$, which receive motion from the gear $c$, which is fixed upon the shaft B, as shown. The gear $d$ meshes with the gear $e$, which is loosely placed upon the shaft A and imparts motion thereto. This gear-wheel $e$ is formed with the clutch D, with which the sliding clutch F, which is placed upon the square extended portion $a'$ of the shaft A, is adapted to engage for imparting motion to the shaft A and the winding-drum indirectly—*id est*, from the pulley-shaft through the system of gearing just described.

The inner end of the shaft B is made square or with many sides, and upon this square or many-sided portion is placed the sliding clutch E, which is adapted to engage with the clutch G, formed upon the inner end of the shaft A, for imparting motion directly to the winding-drum.

The clutches E and F are adapted to be simultaneously operated to simultaneously and respectively engage and disengage with the clutches D and G by means of the longitudinally-sliding rod H, to which rod the spring arms or rods $h$ $h'$, which are secured around the clutches, are attached. The rod H is held by the weight $f$, which is secured to the cord $i$, which passes over the pulley $k$, so as to engage the clutches E and G and disengage the clutches F and D, as shown in Fig. 1, and in order to reverse this arrangement of the clutches and engage the clutches F and D, as shown in Fig. 2, the rod H must be drawn forward by the cord $j$.

Upon the shaft A is secured the brake-wheel K, and above it in the frame is the brake-board L, which is to be operated by a cord, and upon the outside of the pulley $b$ upon the shaft B is secured the brake-wheel M, which may be operated by any suitable mechanism. By means of these brakes the speed of the shafts may be easily controlled.

It will be understood that when the clutches are in the position shown in Fig. 1 the winding-drum is revolved directly from the pulley-shaft; that the gearing has no effect, as the gear-wheel $e$ is left free to turn upon the shaft A, and that when thus arranged the machine operates upon the principle of a simple wheel and axle, and is adapted to elevate light loads rapidly; and, further, that when the clutches are in the position shown in Fig. 2 the drum is revolved through the medium of the gear-wheels, the drum has very slow motion and great power—in this instance four times the power as when clutched as just described— and that when thus arranged the machine is adapted for elevating very heavy loads.

In some instances I propose to attach to one end of the hoisting-rope J a counterbalance-weight which shall be about equal to the capacity of the machine when operating with the gearing, which weight, when elevated, will double the hoisting-power of the machine when operated to lift the load by means of the gearing, and will add to it the power of the weight when the load is lifted by the direct action of the pulley. Besides, in the latter instance the machine will also have the advantage of rapidity of motion.

By placing the brake K directly upon the drum-shaft the weight and load will be sustained without unnecessarily straining or cramping upon the clutches, which would occur if the brake were placed only upon the power shaft or wheel.

Having thus described my invention, I claim as new and desire to secure by Letters Patent—

1. In a hoisting-machine, the winding-drum and the power-wheel placed upon separate shafts, in combination with means, substantially as described, for shifting the power from direct to indirect action upon the winding-drum, and vice versa, as and for the purposes specified.

2. In a hoisting-machine, the shaft C, provided with the gear-wheels $d\ d'$, in combination with the shaft A, provided with the winding-drum $a$ and the loose gear $e$, and the shaft B, provided with the driver $g$, pulley $b$, and the gear $c$, the said shafts being provided with clutch mechanism, whereby the winding-drum is adapted to be driven directly or indirectly from the pulley-shaft, as set forth.

3. The drum-shaft A and the pulley-shaft B, in combination with the sliding clutches E and F and the clutches D and G, the clutch D being formed upon the loose wheel $e$ and the clutch G being formed upon the drum-shaft, substantially as and for the purposes set forth.

4. In hoisting-machines, the sliding clutches E and F, in combination with the rod H, arms $h\ h'$, weight $f$, and operating-cord $j$, substantially as and for the purposes set forth.

5. The brake-wheel K, secured directly upon the separate drum-shaft A, in combination with the brake L, substantially as and for the purposes specified.

VERNON COOK JARBOE.

Witnesses:
   A. B. NORTHRUP,
   K. L. BROWNE.